(12) United States Patent
Mead

(10) Patent No.: US 6,880,303 B2
(45) Date of Patent: Apr. 19, 2005

(54) RAISED ACCESS FLOOR PANEL

(76) Inventor: Steve Mead, 1423 Avon Road, Mississauga ON (CA), L5N 7Z2

(*) Notice: Subject to any disclaimer, the term of this patent is extended or adjusted under 35 U.S.C. 154(b) by 0 days.

(21) Appl. No.: 09/920,640

(22) Filed: Aug. 3, 2001

(65) Prior Publication Data

US 2003/0033767 A1 Feb. 20, 2003

(51) Int. Cl.⁷ .................................. E04B 5/08
(52) U.S. Cl. .................... 52/263; 52/177; 52/800.11
(58) Field of Search ................ 52/126.6, 126.5, 52/311, 126.3, 765, 263

(56) References Cited

U.S. PATENT DOCUMENTS

| | | | |
|---|---|---|---|
| 3,396,501 A | * | 8/1968 | Tate |
| 3,548,559 A | | 12/1970 | Levine |
| 4,142,341 A | | 3/1979 | Mott |
| 4,295,319 A | | 10/1981 | Griffin |
| 4,447,998 A | | 5/1984 | Griffin |
| 4,561,232 A | * | 12/1985 | Gladden, Jr. et al. ......... 52/385 |
| 4,574,555 A | * | 3/1986 | Cline .......................... 52/785 |
| 4,625,491 A | | 12/1986 | Gibson |
| 4,689,870 A | | 9/1987 | Mieval |
| 4,716,840 A | * | 1/1988 | Tringali et al. ............... 108/27 |
| 4,850,176 A | * | 7/1989 | Munsey et al. .............. 52/829 |
| 4,901,490 A | | 2/1990 | Zinniel et al. |
| 4,930,277 A | | 6/1990 | Krumholz et al. |
| 4,942,798 A | | 7/1990 | Krumholtz et al. |
| 4,996,818 A | | 3/1991 | Bettinger |
| 5,048,242 A | * | 9/1991 | Cline ........................ 52/126.6 |
| 5,111,630 A | * | 5/1992 | Munsey et al. .............. 52/508 |

* cited by examiner

Primary Examiner—Carl D. Friedman
Assistant Examiner—Yvonne M. Horton
(74) Attorney, Agent, or Firm—Eugene J. A. Gierczak

(57) ABSTRACT

A floor panel for elevated floors comprising a base adapted to be supported and providing a load bearing surface; an inner panel adhesively secured to said base; an outer panel adhesively secured to said inner panel, said inner panel extending beyond said outer panel so as to present a border along the edge of said inner panel.

20 Claims, 5 Drawing Sheets

RAISED ACCESS FLOOR PANEL

FIELD OF INVENTION

This invention relates to floor structures and particularly relates to a floor panel for an elevated floor wherein said floor panel is supported at its corners on pedestals and particularly relates to the device and method of producing same.

BACKGROUND ART

Elevated floors have been gaining widespread usage and prominence in view of the wide proliferation of computer installed and used in buildings. These elevated floors are sometimes called "computer floors". Generally speaking such elevated floors are designed to be supported on pedestals at the corners of the elevated floors so as to present an access space between the elevated floor and the floor structure that can be used to run electrical cabling, computer lines, air conditioning or other heating systems.

The computer floors may be easily removed in a manner well known to those persons skilled in the art so as to permit individuals to run wires, heating or cooling equipment under the floor as described so as to accommodate changing needs in the building. Accordingly such elevated floors have gained prominence since it is much easier to install wiring, heating and cooling systems or the like under a floor rather than attempting to accommodate the changing needs by running said systems within the wall of a building.

Such floor panels generally comprise a base structure supported at its corners on pedestals and a floor covering laminated to the upper surface thereon to provide a finished exposed floor surface. Such floor surfaces may be carpeted or include a vinyl composite tile (VCT), conductive vinyl tile (CVT) or high-pressure laminate (HPL).

For example U.S. Pat. No. 4,625,491 teaches a floor panel for elevated floors in which a high-pressure laminate floor covering is laminated to the load surface of the panel base. The laminate is provided with a decorative exposed surface and an inner body portion rearwardly therefrom having a colour contrasting with the decorative exposed surface. A border is provided around the edge of the panel by cutting away the decorative surface to expose the contrasting inner body portion.

Moreover U.S. Pat. No. 3,548,559 relates to the bottom or lower sheet formed as a pan with side flanges bent upwardly. A solid core of plywood, composite board or other compression resistant material of a thickness designed for the intended load is glued or otherwise adhered to the inside bottom of the sheet and a flat upper sheet is adhered to the top of the core. Upper and lower sheets are preferably metal and a surface such as vinyl or asbestos tile is adhered to the top surface of the upper sheet. Flanges are bent upwardly to form sides of the panel leaving space between the core and the flanges. The flanges extend up and are preferably bent outwardly to terminate just short of the upper sheet. Within the opening between the top edges of the side flanges and the peripheries of the upper sheet a vinyl trim or other flexible member is wedged around the upper sides of the finished panel.

Moreover U.S. Pat. No. 4,996,818 teaches a floor tile for being removably applied over the floor panels of a raised access floor system. A tile has a generally square base portion with a generally planar top surface and a planar bottom surface, and features flanges that extend downwardly from each of the four corners of the base portion. A square of carpet is bonded to the top surface of the base portion. Opposing pairs of flanges are spaced apart such that a tile may be placed over a floor panel with inner surfaces of tile flanges lying closely adjacent downwardly extending edges of the floor panel to support the tile against lateral movement upon the panel.

Furthermore U.S. Pat. No. 4,942,708 shows an elevated floor assembly comprising a plurality of base panels each having an upper surface, a lower surface and a peripheral edge, each of said base panels including a base panel cladding strip received along said base panel edges, said base panel cladding strips each having a generally upwardly web extending approximately the thickness of said base panel edge, and a generally horizontal access panel engaging flange extending laterally and outwardly from the web, a plurality of access panels each having an upper surface, a lower surface and a peripheral edge; and a plurality of support legs detachably coupled to said base panels, said base panels and said access panels being positioned in alternating juxtaposition whereby said base panels are supported by said support legs and said access panels are supported by said base panel cladding strip flanges.

Furthermore U.S. Pat. Nos. 4,930,277 and 4,901,490 illustrate other raised floor panels.

Furthermore U.S. Pat. No. 4,689,870 relates to a square rectangular floor panel which includes a honeycomb assembly enclosed within two metal cover sheets.

Yet another arrangement is shown in U.S. Pat. No. 4,447,998 which teaches a floor panel for use in elevated floor assemblies which includes a core member, top sheet and a bottom sheet positioned on opposite sides of the core member and a flexible edge member operatively positioned between the top and bottom sheets.

Finally U.S. Pat. No. 4,142,341 relates to a square panel comprising an upper flat sheet load receiving plate and a lower sheet plate having peripheral bent portions resting on pedestals and margin portions which overlap the marginal portions of the plate. An edge strip is mounted on the composite flange. The strip may be fabricated of a vinyl or other extruded plastic material and has an upper flange and a lower flange. A wear surface covering layer is mounted on load receiving plate and its upper surface is flush with the upper surface of edge strip flange.

These and other raised floor systems present relatively complicated structures having limited use. For example U.S. Pat. No. 4,625,491 provides a border which is cut away from the decorative surface so as to expose the contrasting inner body portion comprising of layers of paper. However over time moisture and other environmental elements find their way into the border and particularly the layers of paper and cause the border as well as the raised floor to deteriorate necessitating replacement thereof. Furthermore the cutting action in U.S. Pat. No. 4,625,491 adds materially to the cost of production.

It is an object of this invention to provide an improved raised floor structure which is relatively simple to produce having greater wear characteristics.

DISCLOSURE OF INVENTION

It is an aspect of the invention to provide a floor panel for elevated floors comprising a base adapted to be supported and providing a load bearing surface; an inner panel adhesively secured to said base; an outer panel adhesively secured to said inner panel, said inner panel extending beyond said outer panel so as to present a border along the edge of said inner panel.

It is a further aspect of this invention to provide a floor panel for an elevated floor comprising a rectangular base adapted to be supported at the corners thereof, said base providing a load bearing surface; a rectangular inner panel co-extensive with said rectangular base and adhesively secured thereto; a rectangular outer panel secured to said inner panel, said inner panel extending beyond said outer panel so as to present a border along said peripheral edge of said inner panel.

It is yet another aspect of this invention to provide a method of producing a floor panel for an elevated floor comprising the steps of cutting a rectangular outer panel, said outer panel including a top wear surface, and an adhesive surface opposite said top wear surface; applying an adhesive to said adhesive surface; inserting said top surface into a framed jig adapted to receive and retain said outer surface in a desired position; cutting a rectangular inner panel, said inner panel extending beyond said outer panel so as to present a border along said peripheral edge of said inner panel relative said outer panel; applying an adhesive to both surfaces of said inner panel; inserting said inner panel into a framed jig adapted to receive and retain said inner panel so as to contact and adhesively secure the inner panel to said adhesive surface and present a border along the peripheral edge of said inner panel; applying an adhesive to a rectangular base; inserting said base into said framed jig so as to secure said base to said inner panel so as to produce said floor panel; removing said floor panel from said jig.

BEST MODE FOR CARRYING OUT THE INVENTION

Figure 1:
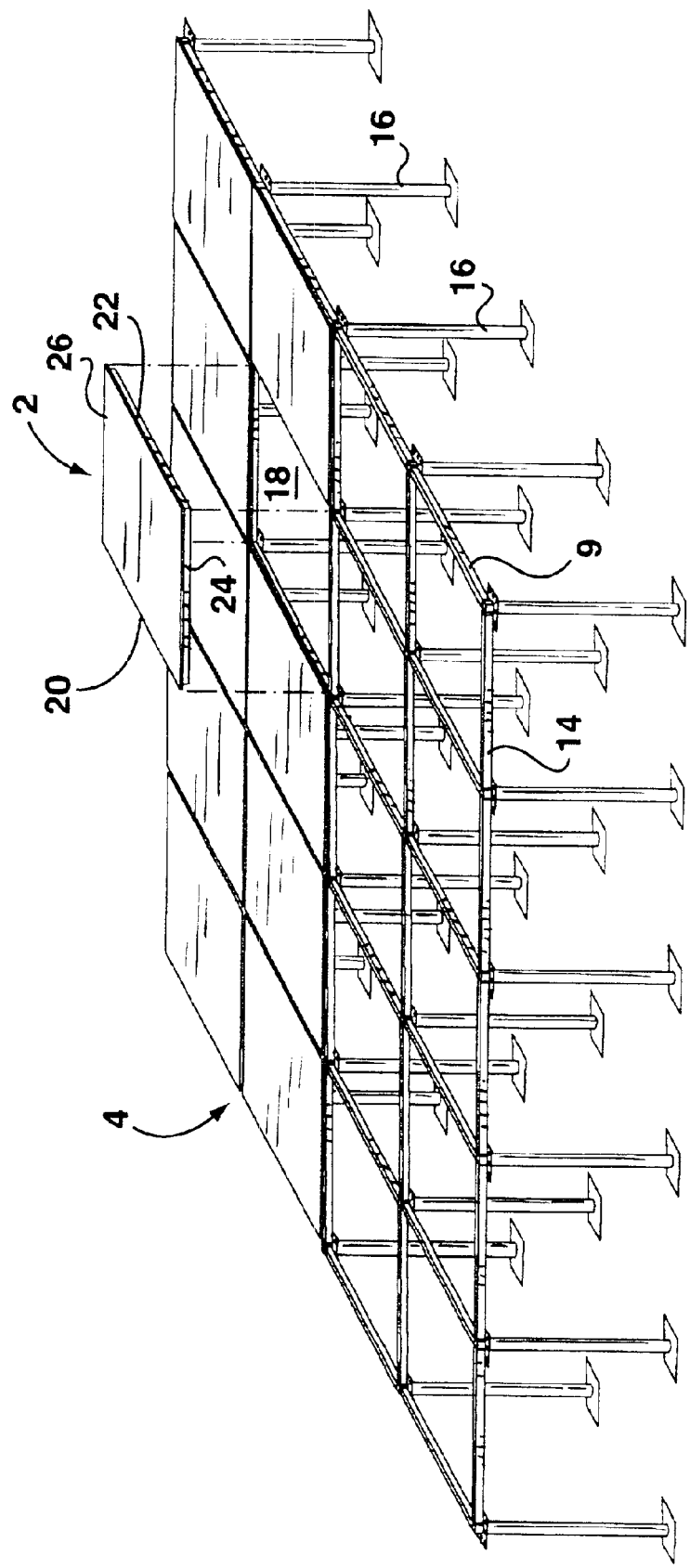
FIG. 1 is a perspective view of an elevated floor.
Figure 2:
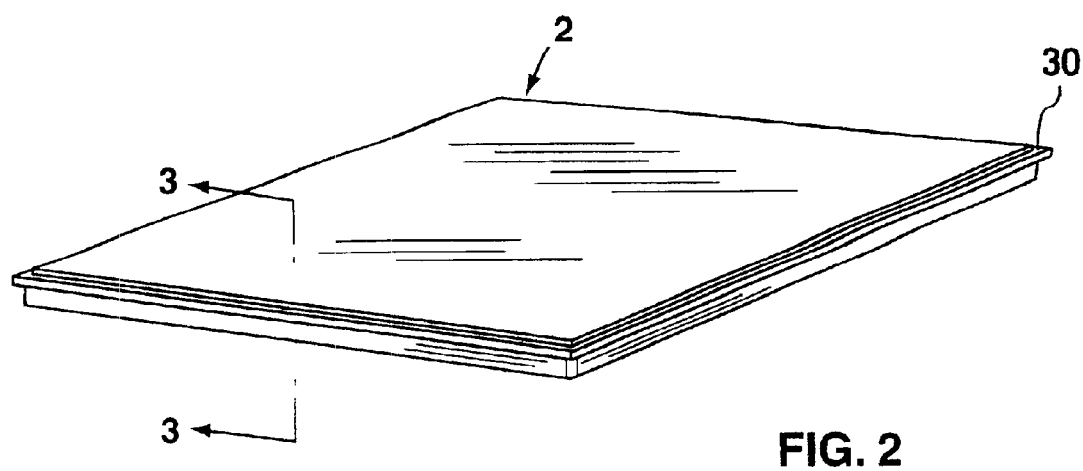
FIG. 2 is a perspective view of a floor panel.
Figure 3:
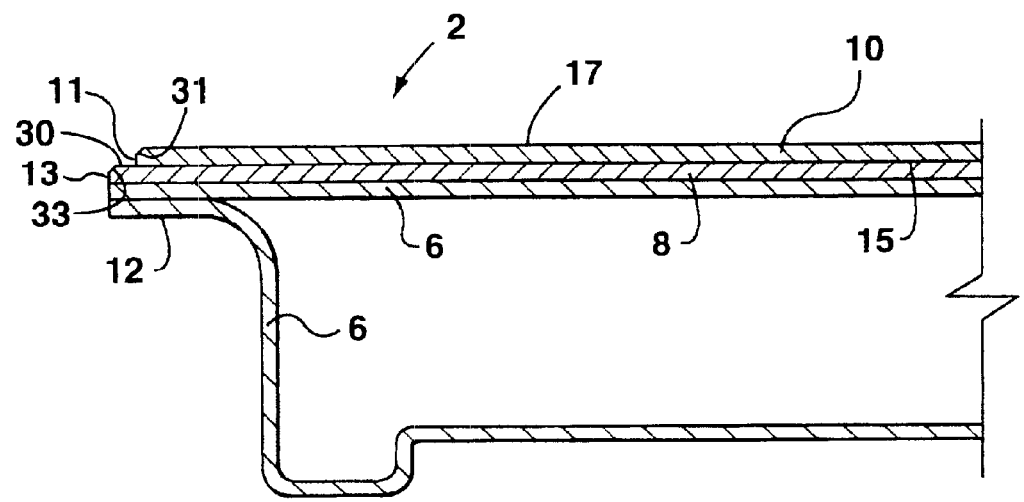
FIG. 3 is a cross-sectional view taken along the lines 3—3 of FIG. 2.
Figure 4:
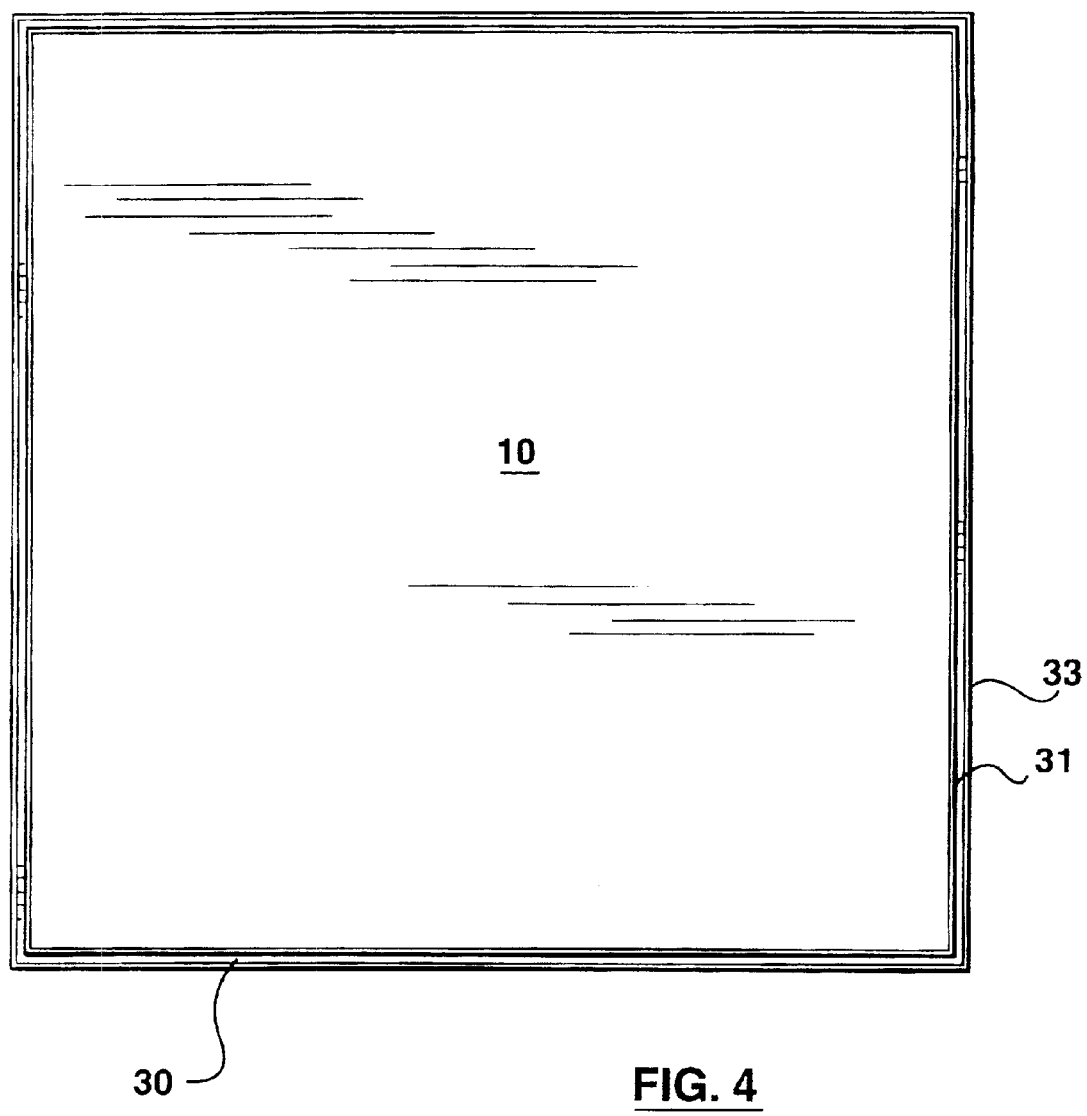
FIG. 4 is a top plan view of the floor panel.
Figure 5:
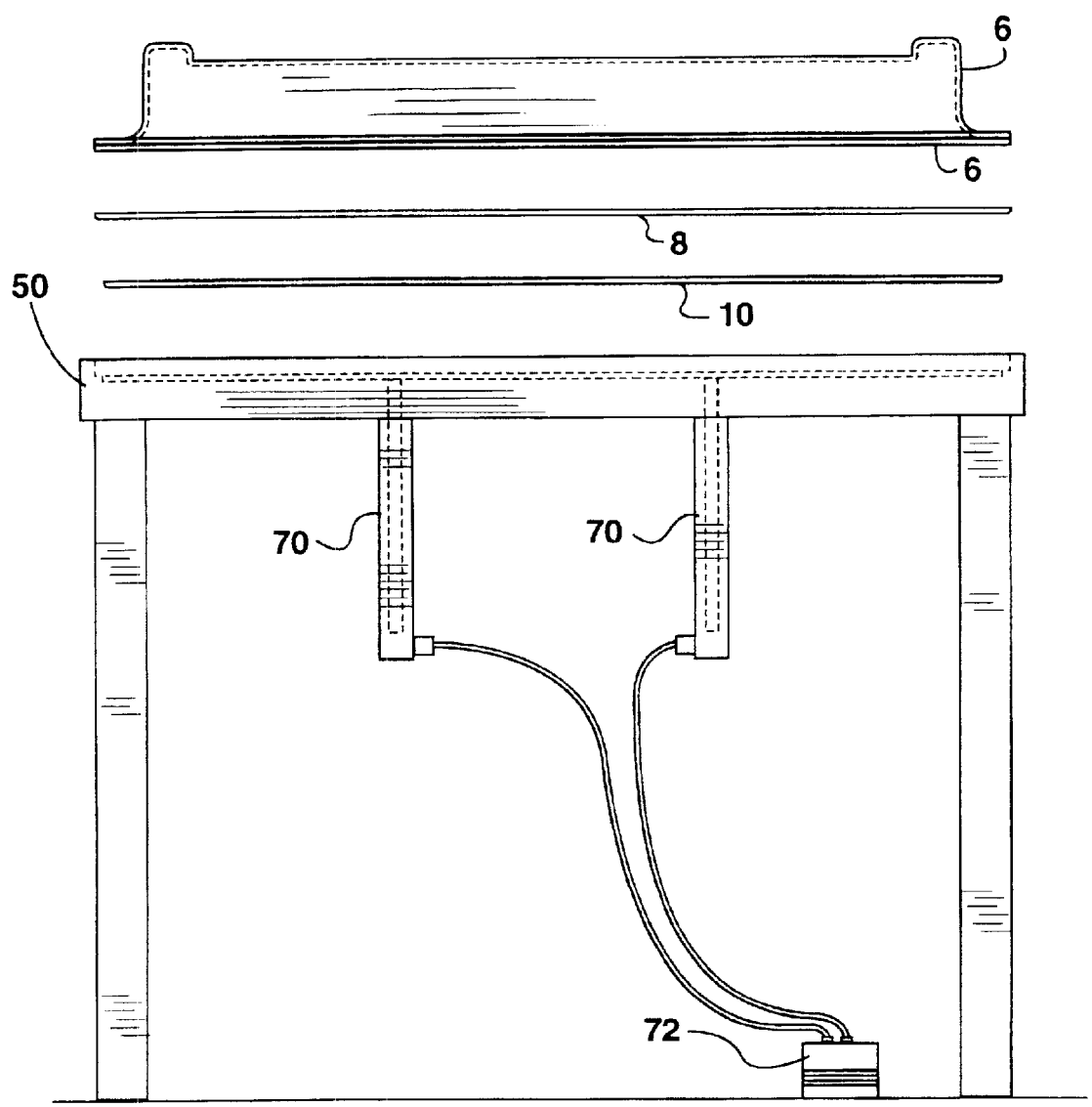
FIG. 5 is a side elevational exploded view of a method of producing the floor panel.
Figure 6:
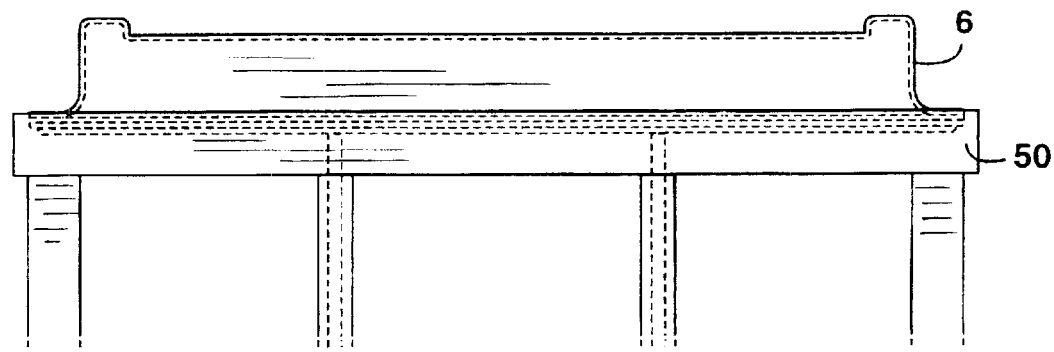
FIG. 6 is a side elevational view of an assembled floor panel in the jig.
Figure 7:
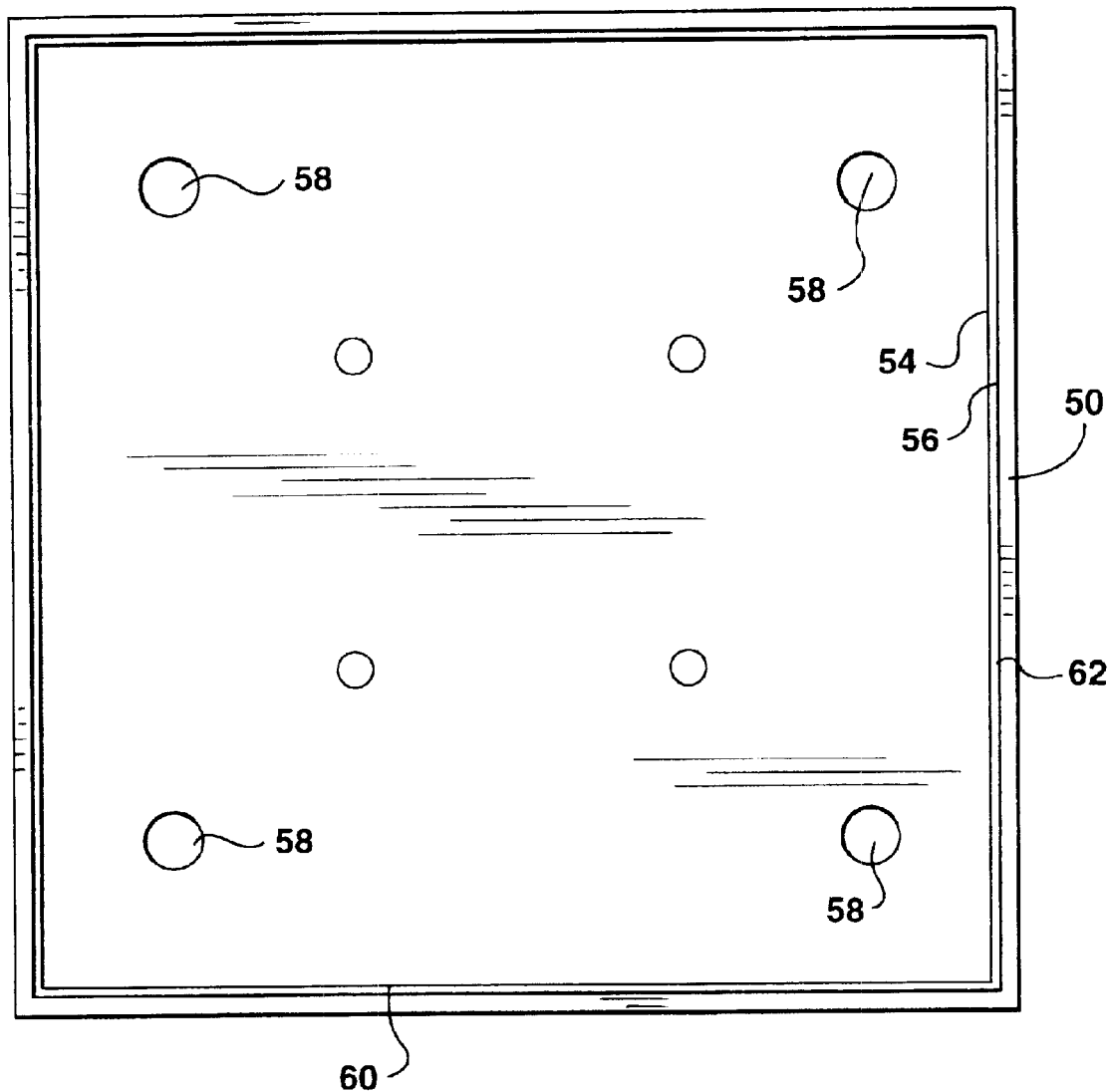
FIG. 7 is a top plan view of the jig.

In the description which follows, like parts are marked throughout the specification and the drawings with the same respective reference numerals. The drawings are not necessarily to scale and in some instances proportions may have been exaggerated in order to more clearly depict certain features of the invention.

FIG. 1 illustrates generally the floor panel 2 for elevated floors 4.

The floor panel 2 comprises a base 6 an inner panel or floor covering 8 and an outer panel or floor covering.

The base is generally stamped from sheet steel or metal from two pieces of metal and spot-welded together in a manner well known to those persons skilled in the art. The base 6 may be hollow as shown or filled with concrete, again in a manner well known to those persons skilled in the art. The base 6 includes an outwardly extending flange or edge portion 12 as shown. The raised floor 4 includes a plurality of stringers 9 which produces a framed structure 14 that rests on a plurality of pedestals 16. The framed structure 14 of the stringers 9 define an opening 18 adapted to receive the base 6 in a manner whereby the stringers 9 contact the flange portions 12 of the base.

Generally speaking the floor panel 2 can comprise of a variety of shapes and in the embodiment shown are rectangular or square which are the most common shapes. However the invention should not be limited to rectangular or square shapes as other hexagonal or hectagonal could be utilized within the spirit of this invention.

The rectangular and square shapes of the floor panels are the most common and accordingly all four sides namely 20, 22, 24 and 26 will present a flange 12 which is adapted to rest against the stringers 9.

The floor panel 2 includes an inner panel 8 that is adapted to be adhesively secured to the top portion 6 of the base. Furthermore the floor panel 2 also includes an outer panel 10 which is adhesively secured to the inner panel 8. The inner panel 8 is co-extensive with the base 6 so that the inner panel 8 can be superimposed on top of the base 6 as shown. The inner panel 8 extends beyond the outer panel 10 so as present a border 30 along the edge thereof as shown in the drawings. The border 30 extends along the entire peripheral edge of the floor panel and may be sized as required. In one example the border or edge trim can have a width of 0.080 to 0.1875 inches. In other words the outer panel layer is smaller in extent that the inner panel 8. However the invention should not be limited to the sizes discussed as any suitable dimension can be used. Furthermore the floor panel can be suitably sized and typically are 24 inches by 24 inches or 600 millimeters by 600 millimeters. Such square designs are typical although the invention should not be limited to same as any size or other shape may be used.

The outer panel or layer 6 may be comprised of a suitable laminate such as a high-pressure laminate or HPL. In one embodiment such high-pressure laminate can be manufactured under the trade name "Formica" or other trade names well known to those persons skilled in the art. Such laminates can be impregnated with resin such as phenolic resin and are laminated under heat and pressure so as to produce a strong, very wear resistant assembly or floor covering. The outer panel may include a decorative surface that is attractive and abrasive resistant. The outer panel can include a high wear film 17 bonded to the top thereof in a manner well known to persons skilled in the art.

Moreover the inner panel is also comprised of a high-pressure laminate material which can be of a different colour such as black, grey, brown or any colour, or design as desired so as to produce an attractive border 30. Alternatively the inner panel may compose rubber or vinyl that is bonded to the outer panel with a suitable adhesive.

Since the floor panel comprises of two pieces of high-pressure laminate material 8 and 10 which are adhered to one another, the border 30 is much more durable than that shown in U.S. Pat. No. 4,625,491. In particular the inner panel 8 may have a high wear film on the top surface of the margin 30 (in other words on the surface between the inner and outer panel 8 and 10 respectively) which is highly resistant to moisture failure or the like. This is in contrast to the edge produced by U.S. Pat. No. 4,625,491 where the laminate surface is cut so as to expose the coloured black paper which is not as highly resistant to moisture or failure as that used in the invention herein.

Typically thicknesses of the outer panel can range from any desired selective thickness and in one embodiment comprises 0.29 inches plus or minus 0.010 inches. Furthermore the top layer of the outer panel 10 may include a high wear film as described earlier. The inner panel may also be of the same thickness as that of the outer panel described above. However the thickness of the outer and inner laminate panels 8 and 10 may vary from $1/16^{th}$ to $1/8^{th}$ of an inch typically. However other sizes may be used.

Moreover the laminate edges may be slightly bevelled by running sandpaper along the edge thereof for a smooth finish and to prevent chipping.

One method of assembling the floor panel 2 comprises utilzing a jig 50 which rests on legs 52 and includes a first frame structure 54 adapted to receive and retain the outer panel 10 between the peripheral edge thereof. In other words the outer panel 10 includes edges 11 which are adapted to contact the edges 54 of the frame of the jig 50. The inner panel also includes an edge 13 which is adapted to contact a second frame structure 56 as shown in the drawings. Levelling means 58 comprise of plastic fittings or the like with air pressure to properly hold the outer panel flat as it is inserted into the jig 50 (sometimes the outer layer can be slightly bowed or non-flat and the levelling means 58 consists of properly levelling the outer panel within the jig 50).

An adhesive is applied to the outer panel (for example on a corner, not shown) and then the inner panel comes into contact with the outer panel within the jig 50. Thereafter the base 6 is adhesively secured within the jig 50.

Accordingly the drawings illustrate a method of providing a floor panel 2 for elevated floor 4 consisting of the steps of:
1. cutting a rectangular or square outer panel 10 where the outer panel may include a top wear surface 17 and an adhesive surface 15 opposite the top wear surface 13.
2. Applying an adhesive to the adhesive surface 15. Such adhesive can be sprayed on at a spraying station. The outer panel 10 may then be moved down a conveyor belt (not shown) to the jig.
3. Inserting the top wear surface 13 upside down into the framed jig 50 adapted to receive and retain the outer panel 10 in a desired position. In this position the edges 11 of the outer panel 10 contact the inner frame of the jig 54.
4. Cutting a rectangular of square inner panel 8 where the inner panel 8 extends beyond the outer panel 10 so as to present a border 30 along the peripheral edge of the inner panel 8.
5. Applying an adhesive to both surfaces of the inner panel (at a spraying station for example). Moving the inner panel 8 to the jig 50.
6. Inserting the inner panel 8 in the frame jig 50 which is adapted to receive and retain the inner surface so as to contact and adhesively secure the inner panel 8 to the adhesive surface 15 of the outer panel 10 to present a border 30 along the peripheral edge of the inner panel 8.
7. Applying adhesive to the base 6 at a spraying station.
8. Inserting the base 6 into the framed jig 50 so as to secure the base 6 to the inner panel 8 and to produce floor panel 2.
9. Removing the floor panel 2 from the jig 50.

The jig 50 may include means to adjust the size of the border which can include metal edges 60 and 62 which can be moved so as to make the framed structure bigger or smaller as required.

Furthermore after the floor panel 2 is ejected it can be inserted between pinch rollers to press the assembly together. Any adhesive on the outer edge can also be wiped up.

The jig 50 also includes ejecting means 70 which can consist of ejecting rams that are activated by a foot pedal 72 to lift the assembled floor panel 2.

By utilizing the two piece high-pressure laminate floor panel 2 and the method described herein one achieves:
1. costs savings for assembling said floor panel 2;
2. reduces the costs of producing the border or trim since cutting is not required;
3. further costs are reduced by not having to use a vinyl trim on the edge of the panel;
4. furthermore the border includes a high wear surface and does not expose paper layers lying within the HPL.

Examples of adhesives that can be used include:
(a) hot melt polyurethane
(b) resin based adhesives
(c) solvent based contact adhesives
(d) water based contact adhesives although the above should not be limited as other adhesives could be used within the spirit of the invention.

Moreover any colour of border or trim can be utilized since the inner panel may comprise of any decorative surface or colour. The colour of the edges in U.S. Pat. No. 4,625,491 however is restricted to the colour of the internal paper which generally is darker such as black, brown or the like. Accordingly the border used by the invention described herein can be any colour or pattern and is not limited to a single colour as those found in U.S. Pat. No. 4,625,491.

Various embodiments of the invention have now been described in detail. Since changes in and/or additions to the above-described best mode may be made without departing from the nature, spirit or scope of the invention, the invention is not to be limited to said details.

What is claimed is:

1. A floor panel for elevated floors comprising:
   (a) a base comprising two spaced pieces of metal joined together to present an outwardly extending flange, one of said pieces, providing a planar load bearing surface;
   (b) an inner planar floor covering adhesively secured to said load bearing surface of said one of said metal pieces;
   (c) an outer floor planar floor covering adhesively secured to said inner floor covering, said inner planar floor covering extending beyond said outer planar floor covering so as to present a border along the edge of said inner floor covering;
   (d) said inner floor covering presenting a high wear film between said inner and outer floor panels, and on said border.

2. A floor panel as claimed in claim 1 wherein said inner floor covering presents another decorative surface.

3. A floor panel as claimed in claim 2 wherein said border includes an edge lying in the same plane as said inner panel.

4. A floor panel as claimed in claim 1 wherein said inner floor covering presents a high wear resin film between said inner and outer floor panels wherein said inner floor covering is comprised of high pressure-laminate.

5. A floor panel as claimed in claim 4 wherein both inner outer floor coverings include a high wear film.

6. A floor panel as claimed in claim 1 wherein said outer floor covering presents an outer clear resin film.

7. A floor panel for an elevated floor comprising:
   (a) a rectangular base structure comprising an upper metallic surface spaced from and connected to a lower metallic surface to define an outwardly extending flange adapted to be supported at the corners of said flange, said upper metallic surface providing a planar load bearing surface;
   (b) rectangular planar inner floor covering co-extensive with said planar load bearing surface of said upper metallic surface and adhesively secured thereto;

(c) a separate rectangular planar outer floor covering secured to said inner floor covering, said inner floor covering extending beyond said outer floor covering so as to present a border along said peripheral edge of said inner floor covering wherein said inner floor covering presents a high wear film between said inner and outer floor covering and said border includes a high wear film.

8. A floor panel as claimed in claim 7 wherein said inner floor covering presents a dark surface, and said outer floor covering presents a decorative surface.

9. The combination of a plurality of panels as claimed claim 7 in abutting, edge to edge contact to as to present an elevated floor.

10. A floor panel for an elevated floor comprising:

(a) a rectangular base structure adapted to be supported at the corner thereof; said base structure providing a load bearing surface;

(b) a rectangular inner floor covering having a dark surface co-extensive with said rectangular base and adhesively secured thereto;

(c) a separate rectangular outer floor covering secured to said inner floor covering, said inner floor covering extending beyond said outer floor coverings so as to present a border along said peripheral edge of said inner floor covering;

(d) wherein said inner floor covering presents a high wear film between said inner and outer floor panels, and said border presents a high wear film.

11. A floor panel as claimed in claim 10 wherein said rectangular base structure is stamped from sheet steel.

12. A floor panel as claimed an claim 10 wherein said high wear film comprises a clear resin film.

13. A method of producing a floor panel for an elevated floor comprising the steps of:

(a) cutting a rectangular planar outer floor covering, said outer floor covering including a top wear surface, and an adhesive surface opposite said top wear surface;

(b) applying an adhesive to said adhesive surface;

(c) inserting said outer floor covering into a framed jig adapted to receive and retain said outer floor covering in a desired position with said to wear surface inserted first into said jig;

(d) cutting a rectangular inner floor covering, said inner floor covering extending beyond said outer floor covering so as to present a border along said peripheral edge of said inner floor covering relative said outer floor covering, said inner floor covering including a top and bottom surface;

(e) applying an adhesive to said top and bottom surfaces of said inner floor covering;

(f) inserting said inner floor covering into a framed jig adapted to receive and retain said inner floor covering so as to contact and adhesively secure the inner floor covering to said adhesive surface of said outer floor covering and present a border along the peripheral edge of said inner floor covering;

(g) applying an adhesive to a planar rectangular load bearing surface presented by a base structure;

(h) inserting said planar rectangular load bearing surface of said base structure into said framed jig so as to secure said base structure to said inner floor covering so as to produce said floor panel;

(i) removing said floor panel from said jig.

14. A method as claimed in claim 13 including means for adjusting the size of said border.

15. A method as claimed an claim 14 including means for levelling said outer panel.

16. A method as claimed in claim 15 wherein said levelling means comprises suction means.

17. A method as claimed in claim 16 including means for ejecting said floor panel from said jig.

18. A method as claimed in claim 17 wherein said ejecting means comprises a plurality of rams for ejecting said floor panel.

19. A method as claimed in claim 18 wherein said adhesive comprises a resin based adhesive.

20. A method as claimed in claim 13 further including the step of pressing said floor panel after said removal step.

* * * * *